United States Patent
Yang et al.

[11] Patent Number: 6,119,918
[45] Date of Patent: Sep. 19, 2000

[54] SOLDER HEAD CONTROL MECHANISM

[75] Inventors: Te-Hui Yang, Hsinchu; Chun-Hsien Liu, Taipei; Ming-Liang Hsieh, Hsinchu, all of Taiwan

[73] Assignee: Industrial Technology Research Institute, Hsinchu, Taiwan

[21] Appl. No.: 09/243,112

[22] Filed: Feb. 3, 1999

[51] Int. Cl.[7] .......................... B23K 31/00; B23K 31/02; B23K 37/00
[52] U.S. Cl. ...................... 228/102; 228/180.21; 228/4.1
[58] Field of Search ............................... 228/180.21, 102, 228/44.7, 4.1, 105, 103, 180.1, 213, 230, 41

[56] References Cited

U.S. PATENT DOCUMENTS

| | | | |
|---|---|---|---|
| 3,840,169 | 10/1974 | Steranko et al. | 228/4 |
| 3,946,930 | 3/1976 | Bell et al. | 228/41 |
| 3,948,433 | 4/1976 | Palmers | 228/230 |
| 4,013,208 | 3/1977 | Mason et al. | 228/44.1 |
| 4,272,007 | 6/1981 | Steranko | 228/213 |
| 4,419,880 | 12/1983 | Hanowich | 73/3 |
| 4,530,456 | 7/1985 | Michelotti | 228/102 |
| 4,568,016 | 2/1986 | Payne | 228/180.1 |
| 4,696,096 | 9/1987 | Green et al. | 29/829 |
| 4,706,004 | 11/1987 | Komatsu et al. | 318/568 |
| 4,844,324 | 7/1989 | Todd | 228/180.2 |
| 5,033,665 | 7/1991 | Todd | 228/103 |
| 5,109,147 | 4/1992 | Erlach | 219/85.16 |
| 5,139,193 | 8/1992 | Todd | 228/180.2 |
| 5,150,827 | 9/1992 | Fries | 228/44.7 |
| 5,176,078 | 1/1993 | Homma et al. | 101/126 |
| 5,178,315 | 1/1993 | Konno et al. | 228/44.7 |
| 5,211,325 | 5/1993 | Schweizer et al. | 228/105 |
| 5,246,099 | 9/1993 | Genovese | 198/807 |
| 5,364,011 | 11/1994 | Baker et al. | 228/180.21 |
| 5,525,777 | 6/1996 | Kukuljan | 219/121.83 |
| 5,574,668 | 11/1996 | Beaty | 364/558 |
| 5,702,049 | 12/1997 | Biggs et al. | 228/105 |
| 5,829,470 | 11/1998 | Yowell et al. | 137/87.08 |
| 5,847,960 | 12/1998 | Cutler et al. | 364/474.29 |

*Primary Examiner*—Gregory Mills
*Assistant Examiner*—Zidia Pittman
*Attorney, Agent, or Firm*—Dougherty & Troxell

[57] ABSTRACT

A solder head control mechanism which uses a movable small size and simply structured acoustic coil linear servomotor to directly drive a solder head to perform soldering operation. The solder head links with a position sensor, a controller and a current output actuator to form a closed loop control mechanism which has small inertia, fast response time and great positioning accuracy. The controller may dynamically change amplifying value to actuate the solder head.

5 Claims, 6 Drawing Sheets

SOLDER HEAD CONTROL MECHANISM

BACKGROUND OF THE INVENTION

1. Field of the Invention

This invention relates to a solder head control mechanism which includes a controller to actuate an acoustic coil linear servomotor, a decoder and a solder head means for controlling the movement of a solder head to perform a work desired.

2. Description of the Prior Art

Conventional solder means mostly use a rotational servomotor to drive a gear set for moving the solder head to a desired position. The solder head is moved by means of a transmission means. The rotation of the servomotor consumes energy. Furthermore feedback speed and position signal depend on rotation value. Control of the solder head depends on a half-loop control that will cause some deviation. Its accuracy is poorer than a full-loop control. Moreover a conventional servo actuator has a fixed amplifying factor. It is not flexible or versatile for different environments and situations such as different speed requirements, different quality requirements, and total process needs. There is still room for improvement.

SUMMARY OF THE INVENTION

In view of aforesaid disadvantages, it is therefore an object of this intentional to provide a control module that employs an acoustic coil linear servomotor and a solder head means to directly drive a solder head. The solder head means further couples with a speed sensor and a position sensor to form a full loop control. An amplification selectional control is further included to divide the amplification of the acoustic coil linear servomotor into several segments to meet system control needs.

The solder head according to this invention is a movable element controlled by an acoustic coil linear servomotor and may vibrate reciprocally in a vector Z axis normal to a plane defined by vector axes X and Y. There is a position sensor to measure the position of the solder head. The position sensor uses a curved shaped photo ruler to match the solder head for shortening measuring time. Conventional linear photo ruler needs a conversion process to measure a non-linear solder head movement and takes longer time. The measurement method is known in the art and forms no part of this invention, thus is omitted here.

The position sensor transmits position signals to a main controller, which in turn issues instructions to move a vector X-Y axis platform so that the solder head may move in X-Y-Z axis concurrently. This invention does not include the control of solder head motion in X-Y axis. This invention does include a controller for controlling the movement of acoustic coil linear servomotor according to proportional integration differential (PID) rules. The motion path is mapping vibration oscillation. There is also a current output actuator to receive signals from the controller and to output current for driving the acoustic coil linear servomotor which in turn moves the solder head to a position desired.

BRIEF DESCRIPTION OF THE DRAWINGS

The invention, as well as its many advantages, may be further understood by the following detailed description in which.

DETAILED DESCRIPTION OF THE PREFERRED EMBODIMENT

This invention uses a position sensor to detect the position of a solder head and sends signals to a controller which in turn actuates a current output actuator to drive an acoustic coil linear servomotor located in the solder head to perform a job required. Details of the components, characteristics and motion principle will be given below.

Figure 1:
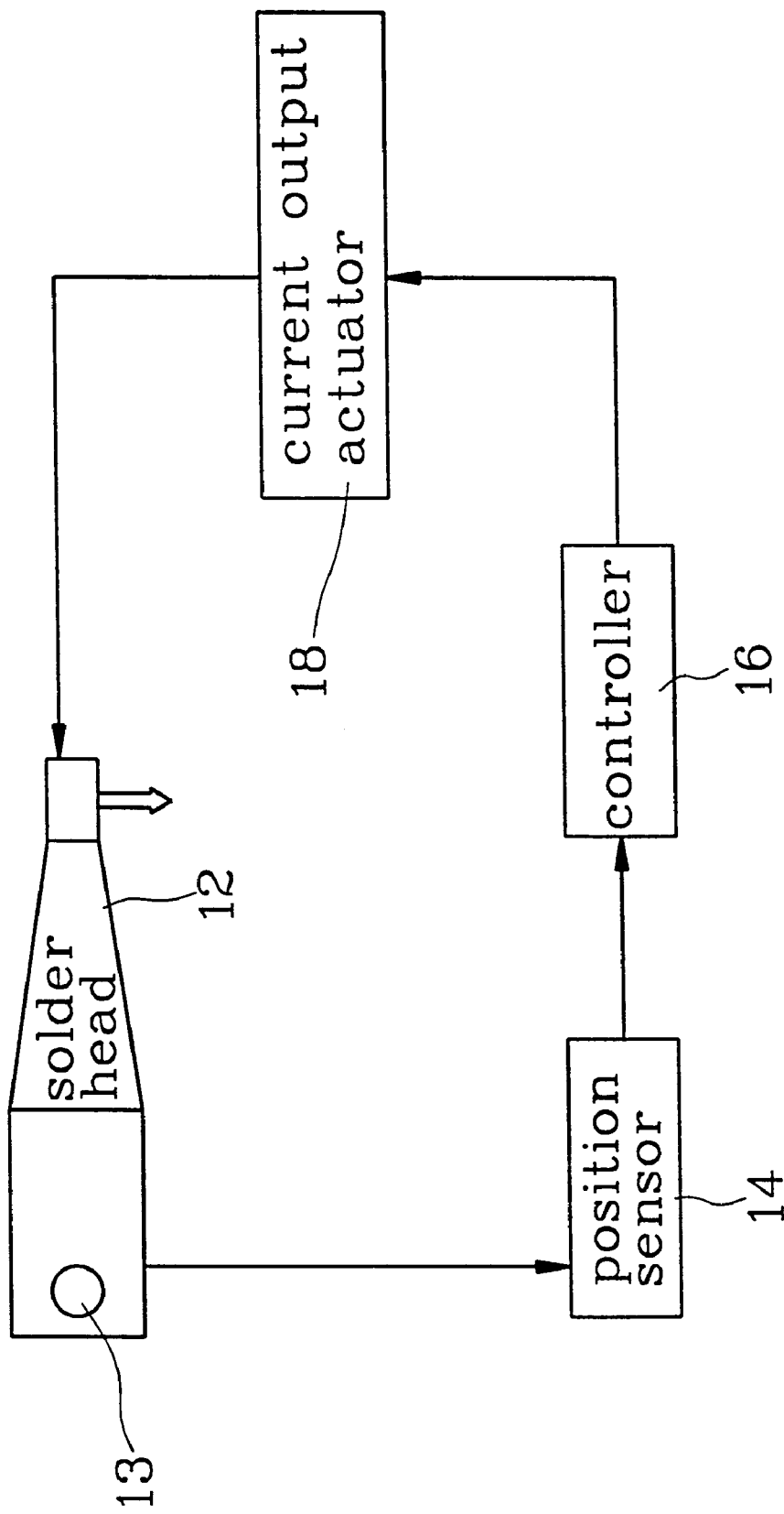
FIG. 1 is a schematic view of a close loop control system of this invention.

Referring to FIG. 1, the solder head 12 of this invention includes an acoustic coil linear servomotor 13. The position of the solder head 12 may be detected by a position sensor 14 which feeds measured signals to a controller 16. The controller 16 has software programs to process the signals and issues control signals to a current output actuator 18 which in turn outputs desirable output current to drive the acoustic car servomotor 13 for the solder head 12 to perform a work desired.

Figure 2:
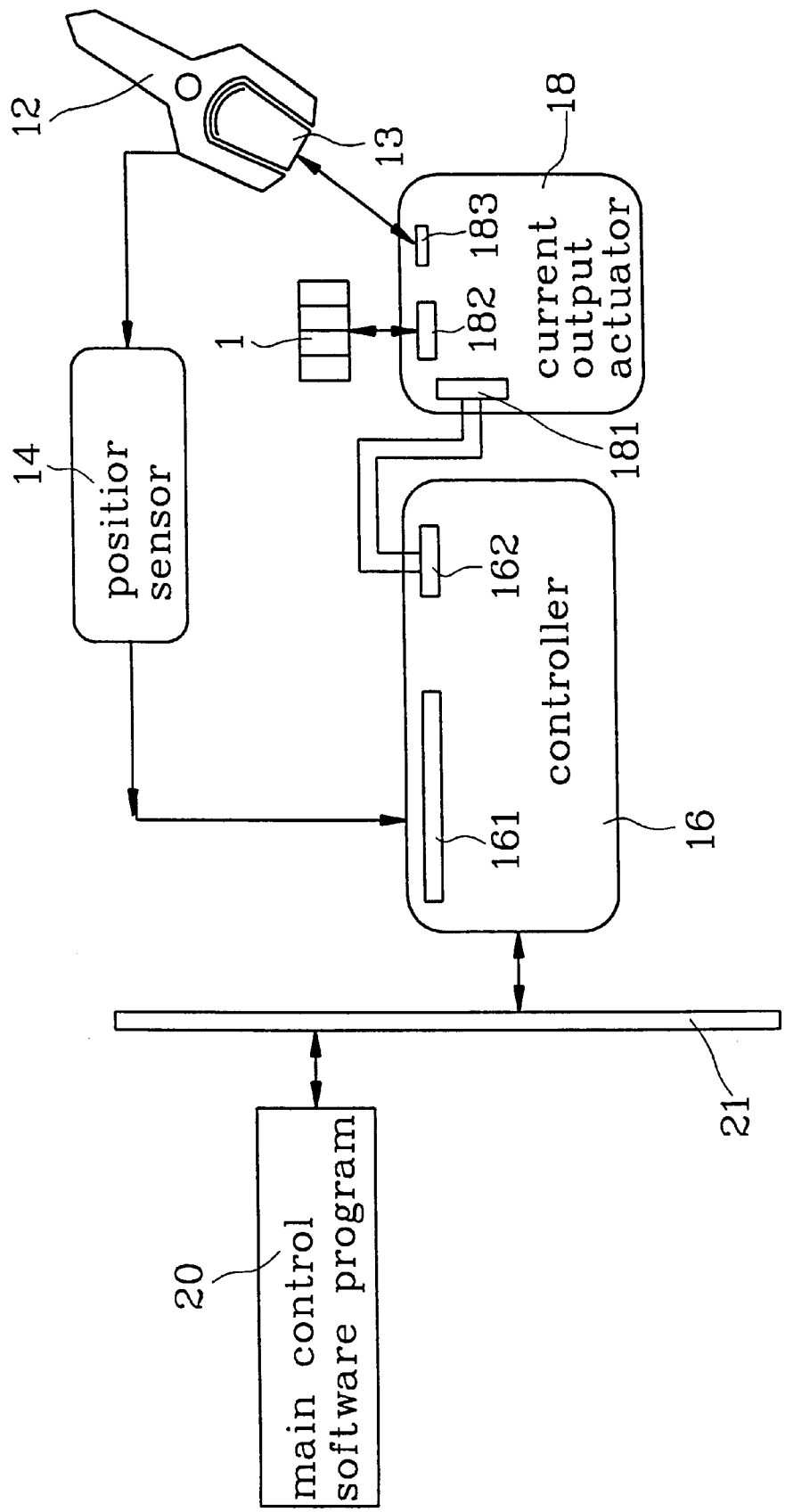
FIG. 2 is a schematic view of hardware structure for the control system shown in FIG. 1.

FIG. 2 illustrates hardware structure of this invention. Inside the solder head 12, there is a movable acoustic coil linear servo motor 13 able to drive the solder head 12 vibrating reciprocally. The vibrating position of the solder head 12 may be detected and measured by a position sensor 14 which transmits the position signals to a controller 16 through a first adapter 161. The controller 16 processes the position signals and issues instructions and control signals to a current output actuator 18 through second and third adapters 162 and 181 located respectively in the controller 16 and the current output actuator 18. The current output actuator 18 has a fourth adapter 182 to receive power from an external power source 1 and has a fifth adapter 183 to output different level of power to drive the acoustic coil linear servomotor 13 to move the solder head 12 to a position desired.

Figure 3:
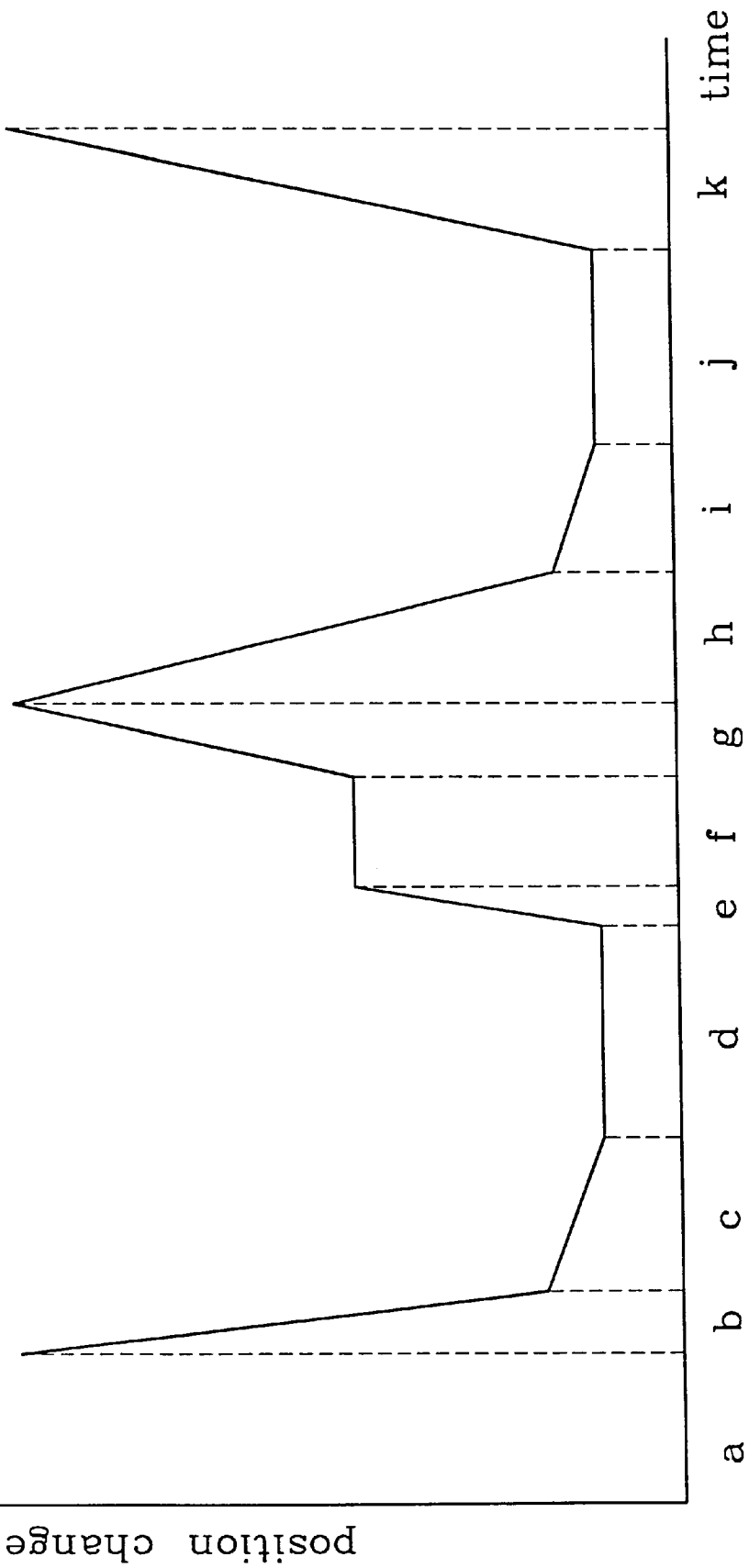
FIG. 3 is a preferred path chart of a solder head of this invention.
Figure 4:
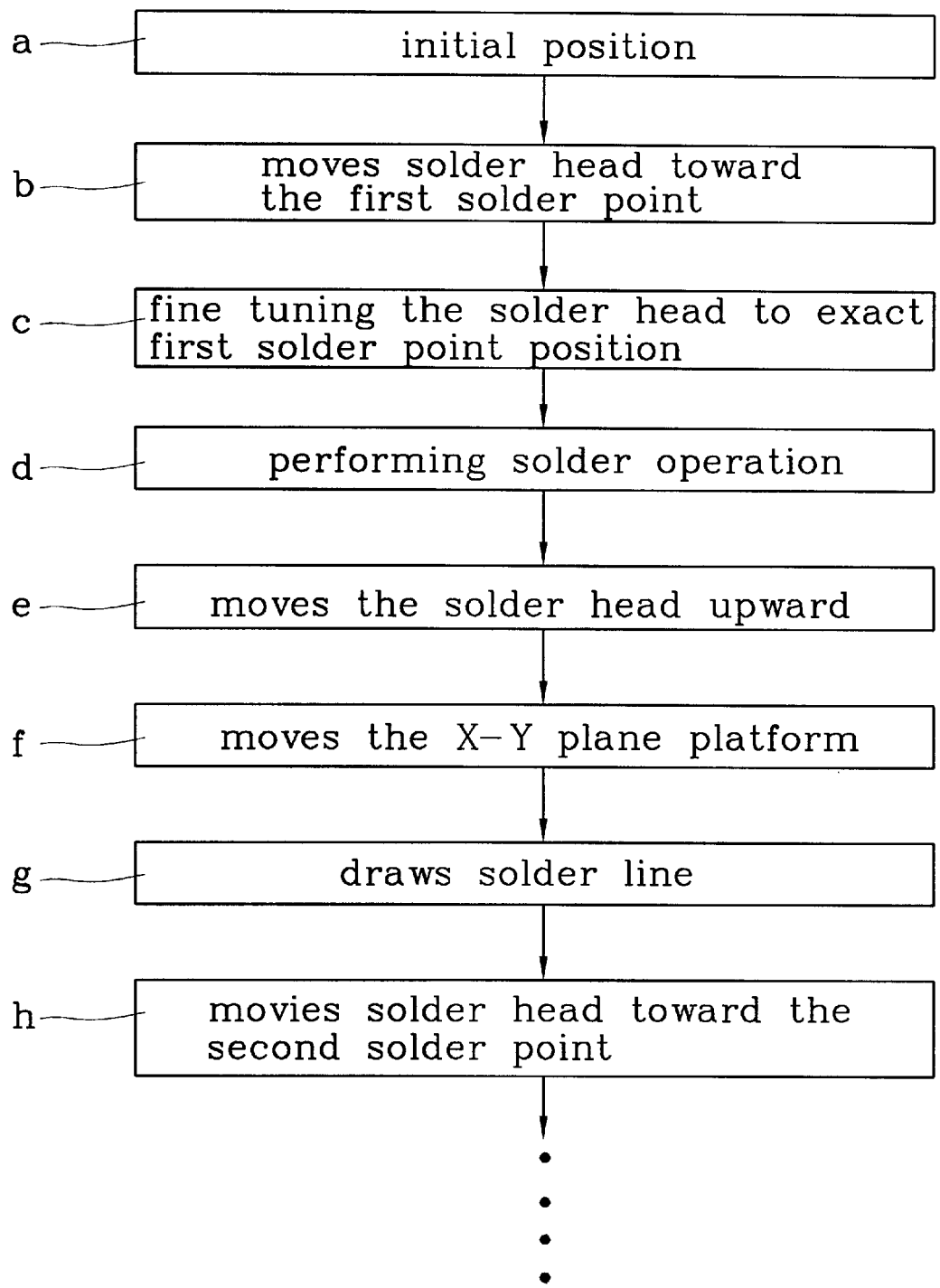
FIG. 4 is a flow chart for the path shown in FIG. 3.

FIGS. 3 and 4 illustrate operation scheme of this invention. The position of the solder head 12 varies depending on work type and time elapsed. After receiving instructions for soldering a first solder point, the solder head 12 moves from an initial position a (step a) toward a point near the first solder point (step b). Then the solder head 12 goes through a fine tuning process c (step c) and moves precisely to the first solder point d to perform soldering operation (step d). After finishing the first solder point operation, the solder head 12 is moved away from the first solder point (step e) to an interim position for the operation platform to move in vector X-Y plane to a position desired (step f). Then the solder head 12 is raised and moved to the initial position and drawing solder wire (step g) for preparing second solder point operation. The solder head 12 then receives instructions to move near the second solder point (step h) to start a next cycle of soldering operation.

Figure 5:
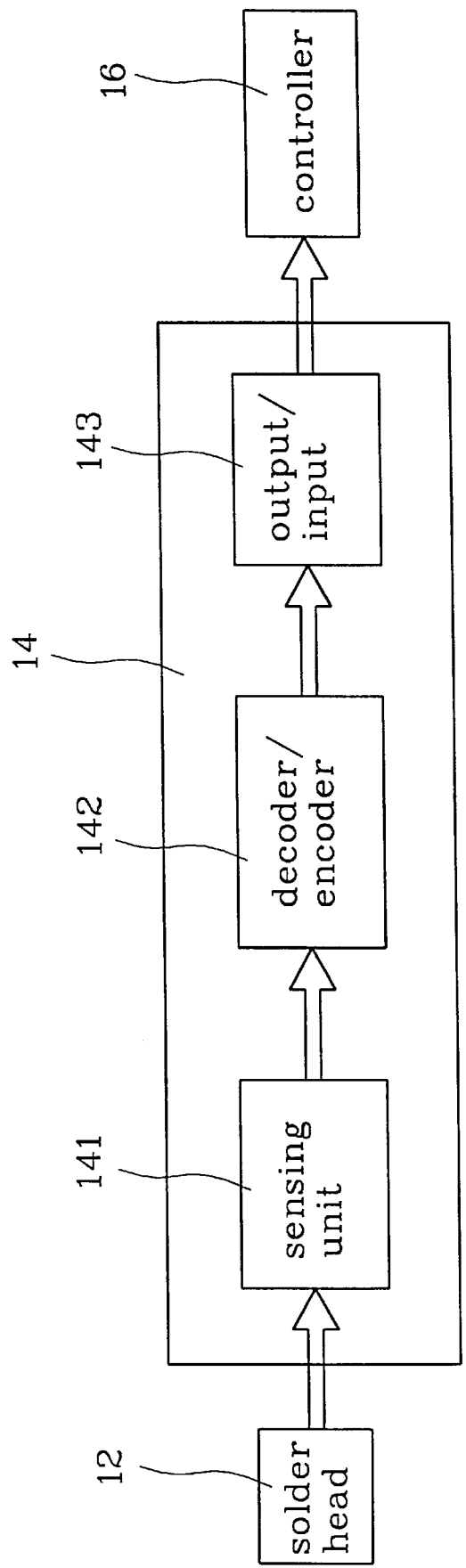
FIG. 5 is a structure block diagram for a position sensor.

During the operation cycle set forth above, the position sensor 14 measures the position of the solder head 12 and feeds back to the controller 16, which in turn calculates and determines the moving position and strength needed for the solder head 12 and issues instructions to the current output actuator 18 to output required current level to drive the solder head 12. The whole operation is performed under digital mode. FIG. 5 further depicts how this is being done. The position sensor 14 has a sensing unit 141 to detect the position of the solder head 12 and feeds the data to a decoder/encoder 142 which feeds processed data to an input/output port 143. The input/output port 143 then feeds processed data to the controller 16.

The moving path of the solder head 12 is generally a curve. This invention uses a mating curved photo ruler to measure the motion of the solder head 12. The measuring data may be directly used without a conversion process which otherwise is needed for a conventional structure that uses a linear photo ruler.

The controller 16 includes at least a detecting unit and a control unit for detecting the position and working condition of the solder head 12, and for issuing control instructions to command the current output actuator 18 to output required current to drive the acoustic coil linear servomotor 13. The motion of the servomotor 13 employs the control principle of proportional integration differential (PID) and its path is a vibration oscillation according to the following equation:

$$S(t) = S\ \max\left(\frac{t}{T\ \max} - \frac{1}{(2\pi)*\sin\left(2\pi\frac{t}{T\ \max}\right)}\right);$$

Where Smax is the total moving length

Tmax is the total processing time.

However the solder head 12 is only part of the total system of the soldering mechanism. E.g., there is vector X-Y plane movement that will be controlled by a main control software program 20 (shown in FIG. 2) which is stored in a main control unit (not shown in the figure) which in turn communicates with the controller 16 through a communication bus 21. The structure and function of the main control unit, main control software program 20 and communication bus 20 are known in the art and form no part of this invention and thus is omitted herein.

Figure 6:
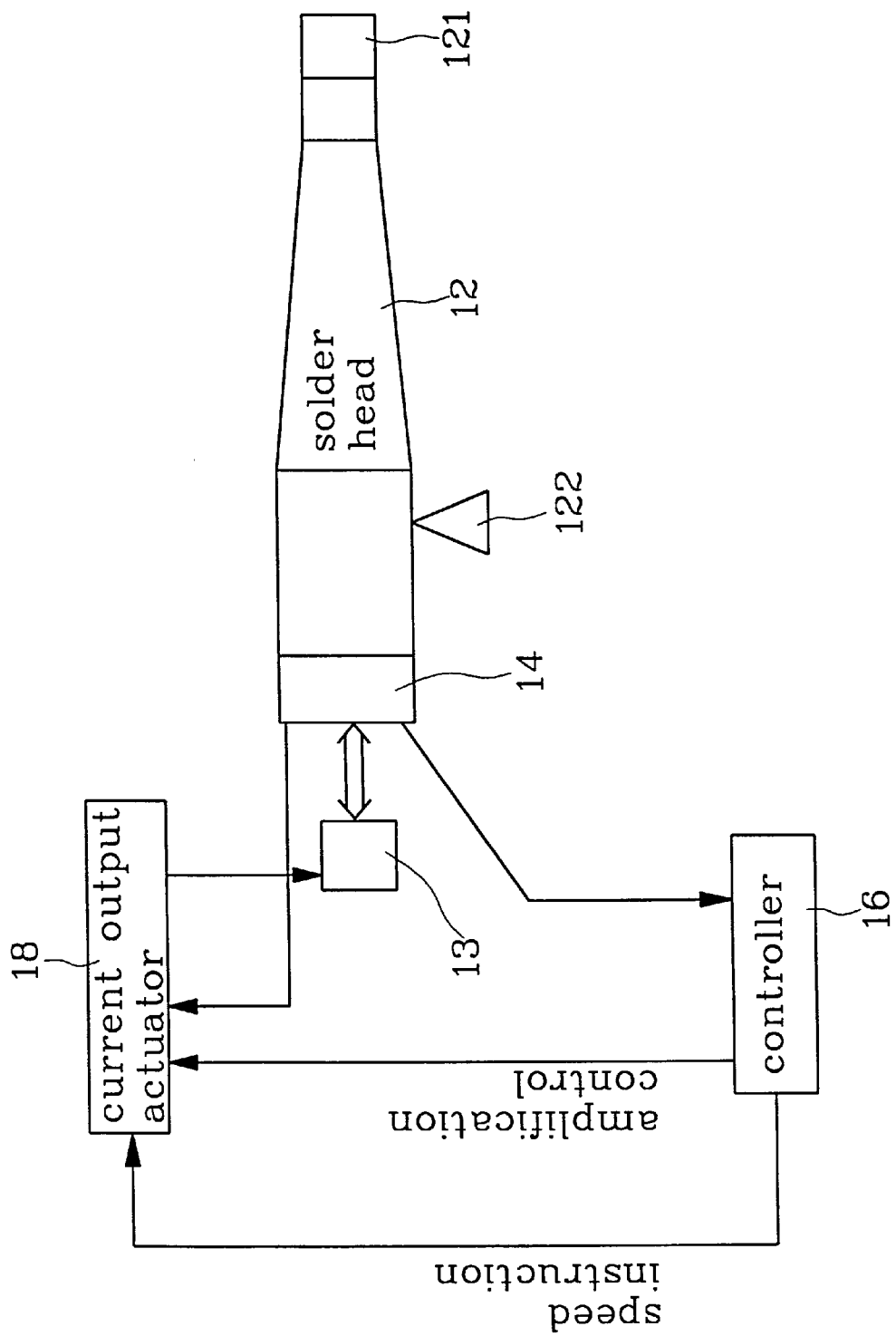
FIG. 6 is a schematic view of the structure of the control mechanism of this invention.

FIG. 6 depicts a more detailed structure of this invention. The solder head 12 has a solder point 121 at one end and is being mounted upon a pivot point 122. Another end of the solder head 12 attaches to the position sensor 14 which is wired to the controller 16 and can detect the position of the acoustic coil linear servomotor 13.

The controller 16 receives working instructions and issues speed instruction and amplification control commands to the current output actuator 18 which moves the acoustic coil linear servomotor 13 to a distance desired. The solder head 12 is moved by the coil linear servomotor 13 and produces a displacement which intrigues the position sensor 14 which in turn generates signals feeding to the controller 16. It thus forms a closed loop operation cycle to move the solder head 12 to perform required soldering operation continuously and precisely.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A solder head control mechanism comprising:
   a) a solder head movable vertically along a Z-axis normal to an X-Y axis plane;
   b) an acoustic coil linear servomotor located inside the solder head to move the solder head along the Z-axis;
   c) a position sensor for detecting the position of the solder head and generating a position signal indicative of the position of the solder head;
   d) a controller connected to the position sensor for receiving the position signal and generating a control signal; and,
   e) a current output actuator connected to the controller, the acoustic coil linear actuator and a power source to form a closed loop control system, the current output actuator controlling the acoustic coil linear actuator to move along a path determined by the principle of proportional integration differential according to the equation:

$$S(t) = S\ \max\left(\frac{t}{T\ \max} - \frac{1}{(2\pi)*\sin\left(2\pi\frac{t}{T\ \max}\right)}\right)$$

where:
$S(t)$=the position of the solder head at time t;
$S_{max}$=total moving length;
$T_{max}$=total processing time.

2. The solder head control mechanism of claim 1 further comprising:
   a) a main control software program controlling movement in the X-Y plane; and,
   b) a communication bus connected to the main control software program and the controller.

3. The solder head control mechanism of claim 1 wherein the position sensor comprises:
   a) a sensing unit to detect the position of the solder head and generating a signal;
   b) a decoder/encoder receiving the signal from the sensing unit and generating processed data; and,
   c) an input/output port receiving the processed data and connected to the controller.

4. A control process for a solder head control mechanism comprising the steps of:
   a) providing a solder head movable vertically along a Z-axis normal to an X-Y axis plane;
   b) providing an acoustic coil linear servomotor inside the solder head for moving the solder head along the Z-axis;
   c) providing a position sensor for detecting the position of the solder head and generating a position signal indicative of the position of the solder head;
   d) providing a controller connected to the position sensor for receiving the position signal and generating a control signal;
   e) providing a current output actuator connected to the controller, the acoustic coil linear actuator and a power source; and,
   f) moving the solder head along a path in the Z-axis determined by the principle of proportional integration differential according to the equation:

$$S(t) = S\ \max\left(\frac{t}{T\ \max} - \frac{1}{(2\pi)*\sin\left(2\pi\frac{t}{T\ \max}\right)}\right)$$

where:
$S(t)$=the position of the solder head at time t;
$S_{max}$=total moving length;
$T_{max}$=total processing time.

5. The control process for a solder head control mechanism of claim 4, wherein the step of moving the solder head comprises the steps of:
   a) setting te solder head in an initial position;
   b) moving the solder head toward a first solder point;
   c) fine tuning the solder head to exactly the first solder point;
   d) performing the soldering operation;
   e) moving the solder head upwardly and away from the first solder point; and,
   f) repeating steps b)–e) for a predetermined number of solder points.

* * * * *